United States Patent
Grube et al.

(10) Patent No.: US 6,333,921 B1
(45) Date of Patent: Dec. 25, 2001

(54) METHOD AND APPARATUS FOR GROUP CALLS IN A WIRELESS CDMA SYSTEM BASED ON DEDICATED CODES

(75) Inventors: Gary W. Grube, Barrington; Richard Comroe, South Barrington, both of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/060,283

(22) Filed: Apr. 14, 1998

(51) Int. Cl.[7] .............................. H04Q 7/20; H04B 7/216
(52) U.S. Cl. ........................ 370/312; 370/342; 455/518
(58) Field of Search ..................................... 370/328, 329, 370/335, 342, 312; 455/518, 519

(56) References Cited

U.S. PATENT DOCUMENTS

| | | | |
|---|---|---|---|
| 5,218,354 | 6/1993 | Hess | 340/826 |
| 5,835,860 | * 11/1998 | Diachina | 455/458 |
| 5,887,252 | * 3/1999 | Noneman | 455/414 |
| 5,914,958 | * 6/1999 | Chintz et al. | 370/441 |
| 6,005,848 | * 12/1999 | Grube et al. | 370/266 |
| 6,222,828 | * 4/2001 | Ohlson et al. | 370/320 |

FOREIGN PATENT DOCUMENTS 0828355    3/1998   (EP) .

* cited by examiner

*Primary Examiner*—Min Jung
(74) *Attorney, Agent, or Firm*—Christopher P. Moreno; Jeffrey K. Jacobs

(57) ABSTRACT

Within a wireless CDMA communication system (100), at least one dedicated inbound code (232, 332, 414–416) and at least one dedicated outbound code (234, 334, 418–420) are provided solely for use in providing group calls. Based on a dedicated inbound code, a subscriber unit transmits a group call signal (505) and a base transceiver system receives the group call signal (703). In turn, the base transceiver system retransmits the group call signal based on a dedicated outbound code (709). Alternatively, or in addition, the base transceiver system sends the group call signal, along with information regarding the dedicated inbound code, to a controller (705–706). Subscriber units can receive group code updates (502, 602) indicating the particular dedicated inbound and outbound codes to be used within a given site. In this manner, the communication system can provide group call functionality in a public system.

36 Claims, 6 Drawing Sheets

METHOD AND APPARATUS FOR GROUP CALLS IN A WIRELESS CDMA SYSTEM BASED ON DEDICATED CODES

CROSS-REFERENCE TO RELATED APPLICATION

Related subject matter is disclosed in prior co-pending, commonly assigned patent applications entitled "Establishment of Multiple Low-Rate Inbound Signaling Links in CDMA Dispatch System" Ser. No. 08/959,327, "Fast Call Setup In a CDMA Dispatch System" Ser. No. 08/959,152, both filed Oct. 28, 1997, and "Method and Apparatus for a Talkgroup Call In a Wireless CDMA System" Ser. No. 08/958,041 filed Oct. 27, 1997.

FIELD OF THE INVENTION

The present invention relates generally to wireless code-division multiple access systems and, in particular, to a method and apparatus for group calls within such systems.

BACKGROUND OF THE INVENTION

A typical dispatch two-way radio communication system comprises communication units, communication resources, communication sites, and a communication resource allocator. Each of the sites have a substantially distinct coverage area and are geographically located throughout the system. Each site also has a number of communication resources assigned to it, where at least one of the communication resources is used as a control channel, while a number of the remaining communication resources are used as voice channels. Such systems are known to use both frequency division multiple access (FDMA) and time division multiple access (TDMA) methods to rebroadcast transmissions.

In a system that supports dispatch group calls (one-to-many calls), the communication units are typically arranged into communication groups (talk groups) and may be located anywhere within the system (in any site). When a communication unit of a talk group requests a group call, it transmits, via a control channel of the site in which it is located, an inbound signaling message to the communication resource allocator. (A group call typically allows all members of the same talk group that are located within the system to communicate with each other.) The inbound signaling message generally comprises the requesting communication unit's individual identification number, identification of the requesting communication unit's talk group, and a request for a group call. Upon receiving the inbound signaling message, the communication resource allocator will allocate a voice channel (i.e., an FDM or TDM channel) in any necessary sites to the requesting communication unit's talk group. In this manner, rapid access communications (typically at the push of a single button) are provided. Dispatch-capable systems, frequently referred to as private systems, are often used by public safety and utility organizations given their need for group communications and rapid system access.

In the last decade, in response to an ever-accelerating worldwide demand for mobile and personal portable communications, spread spectrum digital technology, of which one type is known as code division multiple access (CDMA), has proved to be an alternative for serving large populations of multiple access users over analog or other digital technologies. CDMA relies on processing power to extract a coded signal embedded across a broad frequency spectrum. The only way to extract the wanted signal from among many other overlaid unwanted signals is to have the right code. The use of coding allows more channels to be derived by the overlaying of carriers one over another and greatly enhances performance in terms of derived channels per hertz of bandwidth. The rapid expansion of such cellular communication systems, often referred to as public systems, has decreased the cost for individual users to engage in wireless communications.

Often, users of private, dispatch communication systems are also users of public, cellular communication systems. As a result, providers of wireless communication services have recognized the need for systems which provide the cost efficiency of public systems and also provide the "mission critical" functionality commonly found in private systems. For example, an "IDEN" communication systems by Motorola, Inc. provides both one-to-one and one-to-many communication services based a TDMA architecture. In such a system, however, it is often difficult to dedicate one or more communication resources to a given service because of the constantly evolving system loading characteristics. That is, assuming a given load distribution between the one-to-one and one-to-many services, a number of communication resources can be dedicated to each type of service. However, if the actual load distribution varies from the assumed load distribution, the efficiency for one of the services (the one requiring more resources than it is assigned) decreases. As a result, time division multiplexed (TDM) and frequency division multiplexed (FDM) systems typically do not provide dedicated resources.

Thus, there exists a need for techniques and apparatus allowing a wireless system to provide both the cost efficiency of a public system and the functionality often found in a private system.

DESCRIPTION OF A PREFERRED EMBODIMENT

The present invention generally provides for the support of group calls in a wireless CDMA communication system. Within the system, at least one dedicated inbound code and at least one dedicated outbound code are provided solely for use in providing group calls. Various entities within the communication system, including subscriber units, base transceiver systems and controllers have knowledge of these dedicated codes. Based on a dedicated inbound code, a subscriber unit transmits a group call signal and a base transceiver system receives the group call signal. In turn, the base transceiver system retransmits the group call signal based on a dedicated outbound code. Alternatively, or in addition, the base transceiver system sends the group call signal, along with information regarding the dedicated inbound code, to the controller. In that case, the controller sends the group call signal and information regarding the dedicated outbound code to at least one base transceiver system for retransmission. Also, subscriber units can receive group code updates indicating the particular dedicated inbound and outbound codes to be used within a given site. In this manner, the communication system can provide group call functionality, commonly found in private systems, in a public system.

Figure 1:
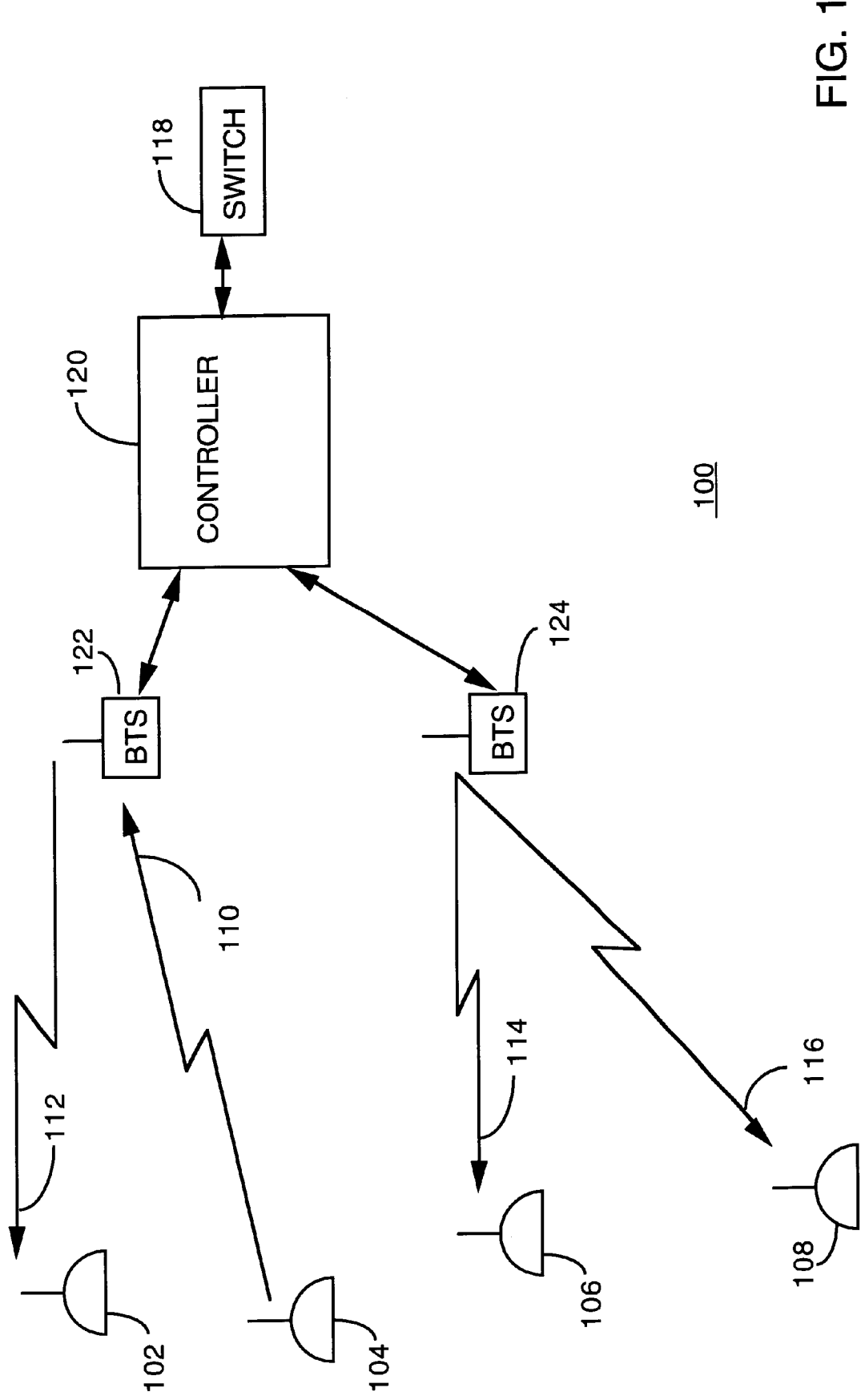
FIG. 1 is a block diagram of a wireless communication system in accordance with the present invention.

The present invention can be more fully described with reference to FIGS. 1–8. FIG. 1 is a block diagram of a wireless communication system 100 in accordance with the present invention. The wireless communication system 100 is a suitably modified CDMA system such as a Wideband Spread Spectrum Digital Cellular System in accordance with, for example, the Telecommunications Industry Association/Electronic Industries Association Interim Standard 95 (EIA/TIA IS-95) as known in the art, and comprises a plurality of subscriber units 102–108 in wireless communication with a fixed infrastructure. For the purposes of illustration, it is assumed that the subscriber units 102–108 are arranged into at least one talk group. In the illustrative embodiment, each of the subscriber units 102–108 is physically capable of duplex communications, although during typical group communications, only a single subscriber unit is transmitting at a time.

Communication channels are effectively provided through the use of codes using well known techniques, e.g., through a combination of orthogonal Walsh/Hadamard codes, long codes and pseudorandom noise (PN) sequences as in conventional cellular CDMA systems. When a group call occurs, at least one dedicated inbound code is used to effectively provide at least one inbound traffic channel (reverse link) 110. Additionally, at least one dedicated outbound code is used to effectively provide at least one outbound traffic channel (forward link) 112–116 to each subscriber unit in the talk group. It is anticipated that the at least one outbound traffic channel could be provided using separate dedicated outbound codes for each receiving subscriber unit, or that a single dedicated outbound code could be shared by the receiving subscriber units. The dedicated inbound and outbound codes and usage thereof are described in greater detail below with reference to FIGS. 2–8. The inbound traffic channels can be low-rate links as discussed in co-pending patent applications "Establishment of Multiple Low-Rate Inbound Signaling Links in CDMA Dispatch System" Ser. No. 08/959,327, "Fast Call Setup In a CDMA Dispatch System" Ser. No. 08/959,152, and "Method and Apparatus for a Talkgroup Call In a Wireless CDMA System" Ser. No. 08/958,041, or in the alternative, can be full-rate traffic channels as known in the art. In the example illustrated in FIG. 1, multisite operation is shown, i.e., where the subscriber units corresponding to the group are spread out among more than one site. In particular, the inbound traffic channel 110 and first outbound traffic channel 112 are provided to a first subscriber unit 104 and a second subscriber unit 102, respectively, at a first site via a first base transceiver system 122 using dedicated inbound and outbound codes that are unique within the first site. Additionally, second and third outbound traffic channels 114–116 are provided to third and fourth subscriber units 106–108, respectively, at a second site via a second base transceiver system 124 using the dedicated inbound and outbound codes that are unique within the second site and, depending on various system parameters such as geographic site separation, possibly the same as the codes used in the first site. Of course, it is possible that all subscriber units corresponding to a group could be located within a single site, in which case a single base transceiver system would be used to provide the channels.

The fixed infrastructure comprises those elements normally required to support communications within the wireless system 100 and, in the preferred embodiment, conforms to a typical CDMA architecture. In particular, the fixed infrastructure comprises a switch 118 in communication with a controller 120 that, in turn, is in communication with base transceiver systems (BTSs or base stations) 122–124. The switch 118 (often referred to as a Mobile Switching Center or MSC), controller 120 (often referred to as a Base Site Controller or BSC) and BTSs 122–124 are all well known in the art. In the example shown, the BTSs 122–124 are used for the transmission and/or reception of the inbound traffic channel 110 and the outbound traffic channels 112–116. In practice, switch 118 typically communicates with more than one controller, and may communicate with other equipment not shown. For purposes of simplicity, the fixed infrastructure has been limited as shown in FIG. 1. The management of group call processing is preferably handled by the controller 120. In the alternative, the functionality of group call handling, as described below, may be distributed throughout the fixed infrastructure. More detailed descriptions of the subscriber units 102–108, BTSs 122–124 and controller 120 are presented below relative to FIGS. 2–4, respectively.

Figure 2:
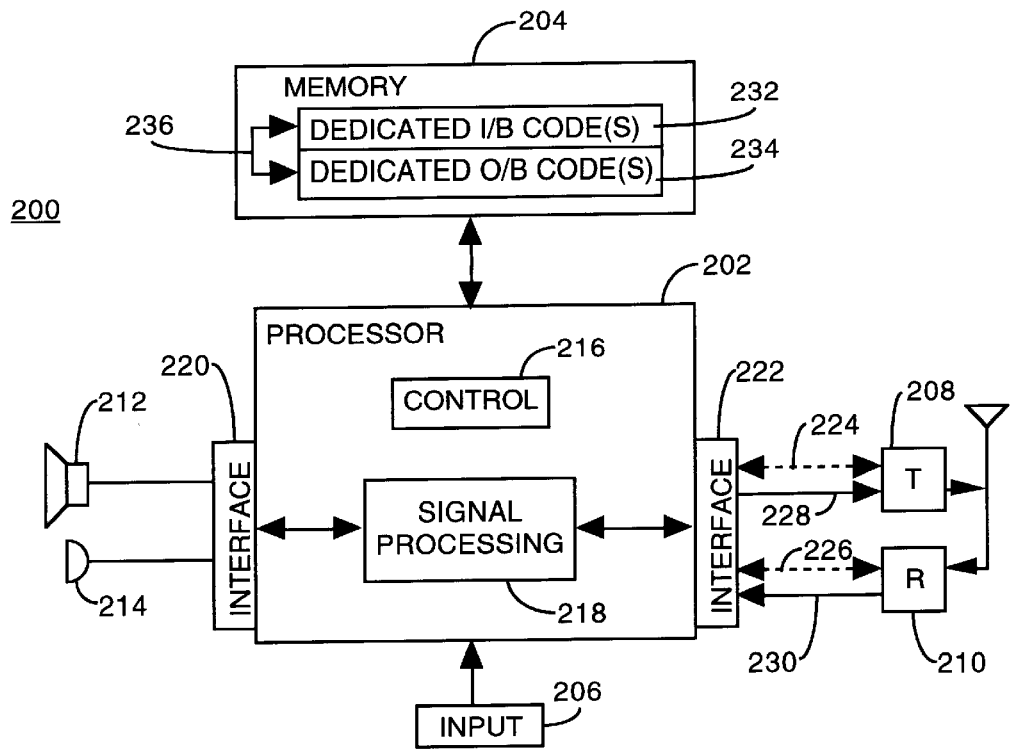
FIG. 2 is a block diagram of a subscriber unit in accordance with the present invention.

A subscriber unit 200 in accordance with the present invention is illustrated in FIG. 2. In particular, a processor 202, which typically comprises one or more processing devices (e.g., microprocessors, digital signal processors, etc.), is coupled to a memory 204, such as random access memory (RAM), read-only memory (ROM) or similar device, or combination of such devices capable of storing digitally represented information. The processor 202 is also coupled to an input device 206, transmitter 208, receiver 210, speaker 212 and microphone 214. Each of these elements are well-known in the art. The input device 206, which may comprise a keypad, menu-driven display, push-to-talk button or similar device or combination of such devices, allows users to signal requests for group calls to the processor 202 and, in turn, thereby participate in group calls. Additionally, the input device 206 is used to provide a request for a group code update message, as discussed below.

Figure 5:
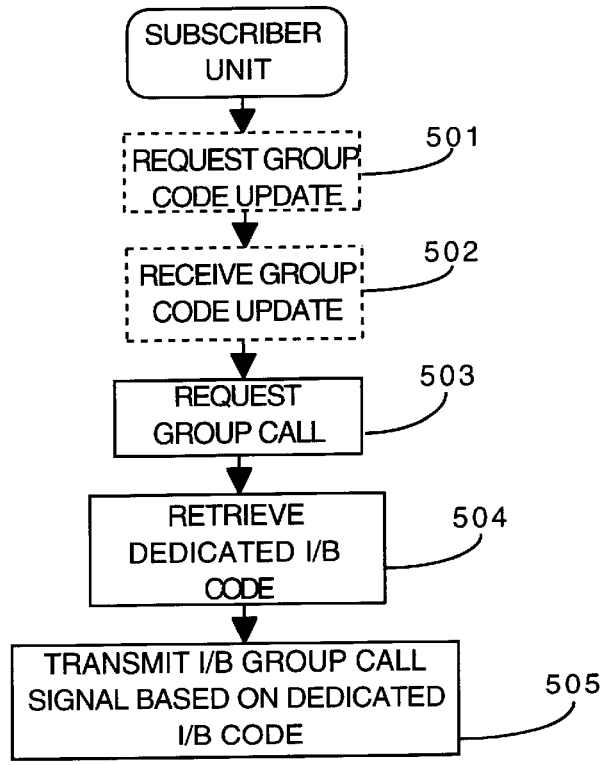
FIGS. 5 and 6 are flow charts illustrating methods for use by a subscriber unit in accordance with the present invention.

In the preferred embodiment, under control of software algorithms stored in the memory 204 and in cooperation with the other elements shown, the processor 202 performs those tasks required for operation of the subscriber unit, including the methods described relative to FIGS. 5 and 6 below. In particular, the processor 202 includes a control function 216 and signal processing 218. As known in the art, the control function 216 includes those management tasks necessary for proper operation of the subscriber unit 200; the signal processing 218 may include any digital voice processing and/or signal conditioning algorithms necessary for voice communications. In the embodiment shown, the processor 202 communicates with the speaker 212 and microphone 214 via first interface circuitry 220 and with the transmitter 208 and receiver 210 via second interface circuitry 222. Such interface circuitry, which may include separate software algorithms, is well known in the art.

In the preferred embodiment, the transmitter 208 and receiver 210 operate in accordance with CDMA protocols.

Depending on design constrains, either or both of the transmitter 208 and receiver 210 may provide no more than wireless signal modulation and demodulation functionality, or may provide more extensive signal processing, such as conversion of wireless signals to baseband information signals, as known in the art. Communications between the processor 202 and the transmitter 208 are shown as two separate paths. A transmitter control path 224 is used to convey non-data related information between the processor 202 and transmitter 208. Such non-data related information includes control parameters from the processor 202 necessary for the transmitter to operate correctly, e.g., inbound codes used to provide inbound traffic channels, etc. The transmitter data path 228 is used to convey information to be wirelessly transmitted, e.g., control signaling (such as requests for group calls or for group code updates), digital voice/data information, etc. Likewise, communications between the processor 202 and the receiver 210 are also shown as two paths. The receiver control path 226 is used to convey information required for proper operation of the subscriber unit, e.g., a detection signal as described below. The receiver data path 230 is used to convey wirelessly received information, e.g., control signaling (such as group code update messages), digital voice/data information, etc., to the processor 202.

The memory 204 of the subscriber unit comprises at least one dedicated inbound code 232 and at least one dedicated outbound code 234. Additionally, the memory comprises information 236 associating dedicated inbound codes to their corresponding dedicated outbound codes. The information 236 associating the dedicated codes may comprise, for example, stored addresses for corresponding codes, or may arise out of the data structure used to store the dedicated codes. Regardless, in the preferred embodiment, the at least one dedicated inbound code 232 and the at least one dedicated outbound code 234 correspond to the given site in which the subscriber unit is currently operating, and are therefore provided to each subscriber unit on a site-by-site basis. Also in the preferred embodiment, the dedicated codes 232–234 are arranged to provide a separate pair comprising one of the dedicated inbound codes 232 and one of the dedicated outbound codes 234 for each talk group that the subscriber unit is capable of communicating with. For example, if the subscriber unit can communicate within five different talk groups, the subscriber unit would require at least five different pairs of dedicated inbound and outbound codes if the subscriber unit is going to be able to participate in group calls for all five groups. Of course, some number of dedicated code pairs less than the maximum number of groups available to the subscriber unit could be provided, thereby selectively enabling group call functionality for a given subset of groups. The actual form of the dedicated codes 232–234 depends on the type of CDMA system used. For example, in systems adhering to either the IS-95 or Interim Standard 665 (IS-665) protocol, a combination of a long code and a Walsh/Hadamard code are used to provide distinct forward traffic channels. In contrast, only a long code is used to differentiate between reverse traffic channels in IS-95 systems, whereas a Walsh/Hadamard code is used to differentiate reverse traffic channels in IS-665 systems.

As used in the present invention, each dedicated code 232–234 is "dedicated" in the sense that it is reserved solely for use with group call processing; in the preferred embodiment, no other call processing functions may use the dedicated codes 232–234. While the use of such dedicated resources in a TDM or FDM system would eventually prove to be inefficient, since costly physical resources have to be dedicated, such reservation of resources in a CDMA system has a much smaller impact since the dedicated resources are simply codes. Relative to the subscriber unit 200, one of the at least one dedicated inbound codes 232 is used in the transmitter 208 to transmit an inbound group call signal; conversely, one of the at least one dedicated outbound codes 234 is used to receive an outbound group call signal.

Figure 3:
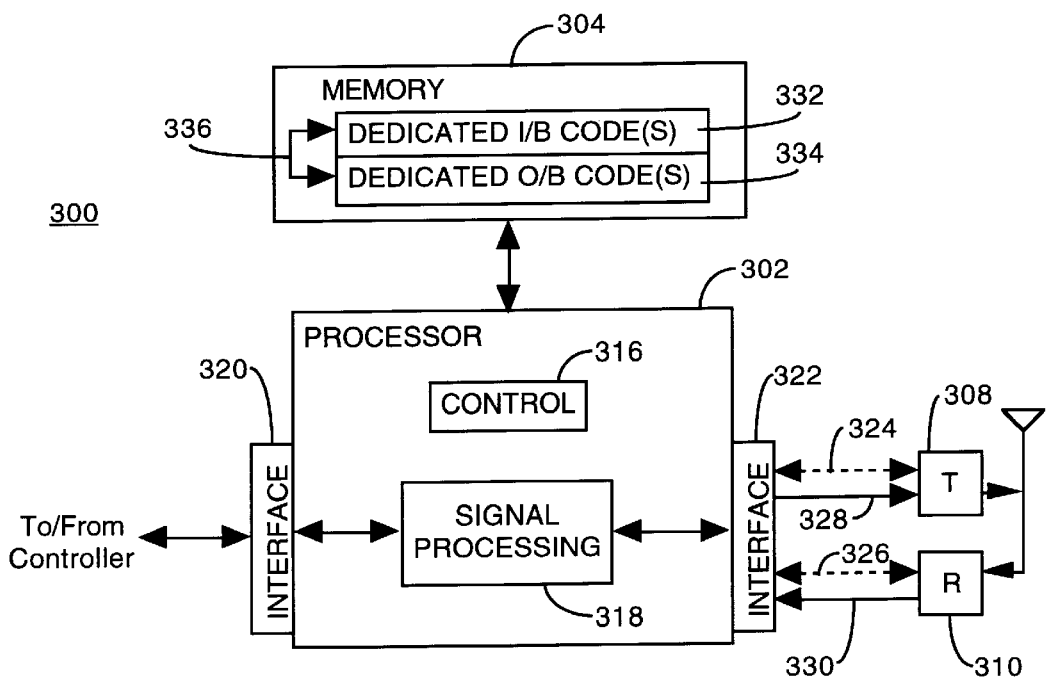
FIG. 3 is a block diagram of a base transceiver system in accordance with the present invention.

Referring now to FIG. 3, a base transceiver system (base station) 300 is shown. In particular, a processor 302, which typically comprises one or more processing devices (e.g., microprocessors, digital signal processors, etc.), is coupled to a memory 304, such as RAM, ROM or similar device, or combination of such devices capable of storing digitally represented information. The processor 302 is also coupled to a transmitter 308 and receiver 310. Each of these elements are well-known in the art.

Figure 7:
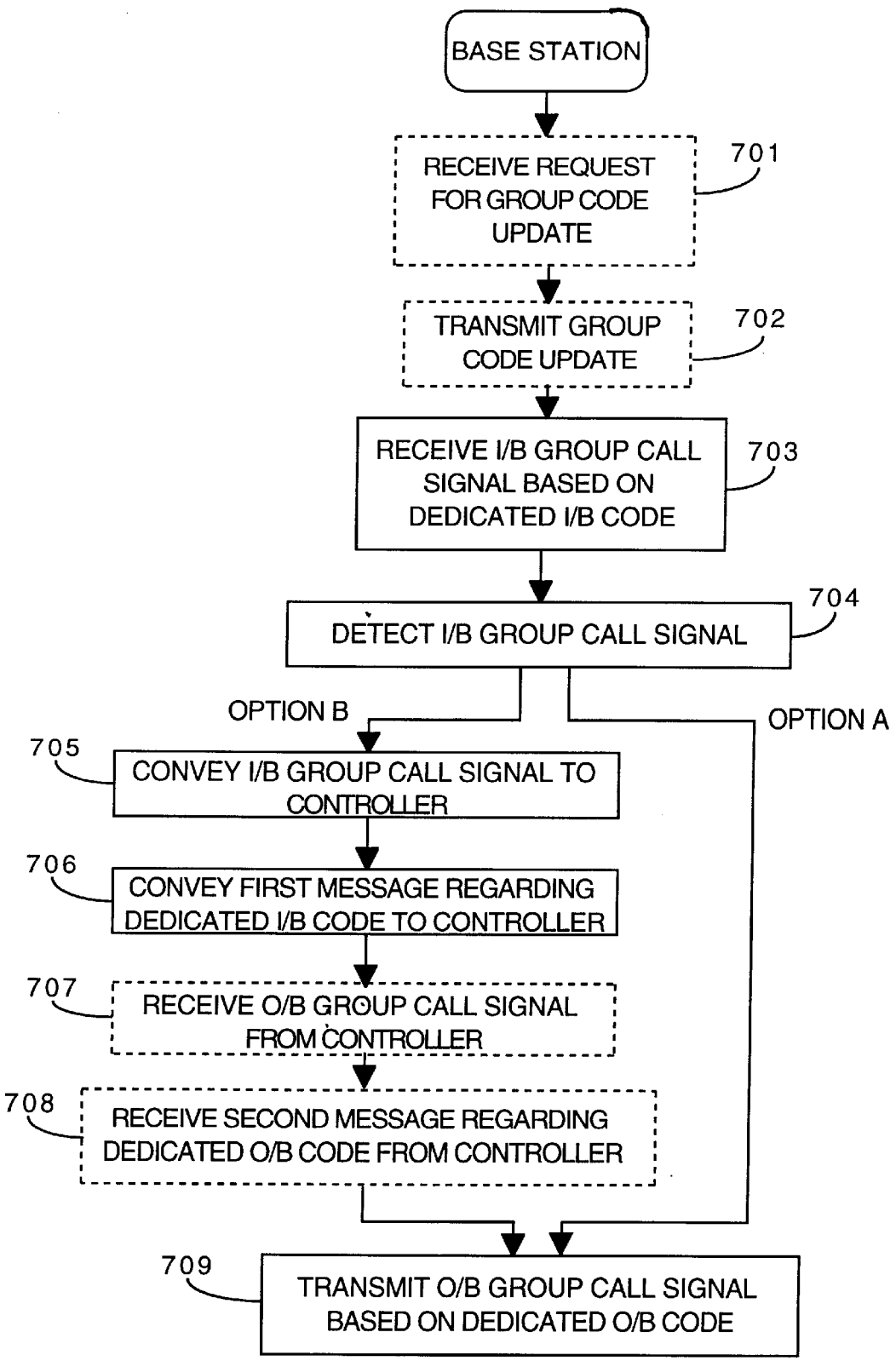
FIG. 7 is a flow chart illustrating a method for use by a base transceiver system in accordance with the present invention.

In the preferred embodiment, under control of software algorithms stored in the memory 304 and in cooperation with the other elements shown, the processor 302 performs those tasks required for operation of the BTS, including the methods described relative to FIG. 7. In particular, the processor 302 includes a control function 316 and signal processing 318. As known in the art, the control function 316 includes those management tasks necessary for proper operation of the BTS 300; the signal processing 318 may include any digital voice processing and/or signal conditioning algorithms necessary for voice communications. In the embodiment shown, the processor 302 communicates with a controller (not shown) via first interface circuitry 320 and with the transmitter 308 and receiver 310 via second interface circuitry 322. Such interface circuitry, which may include separate software algorithms, is well known in the art.

In the preferred embodiment, the transmitter 308 and receiver 310 operate in accordance with CDMA protocols. Depending on design constrains, either or both of the transmitter 308 and receiver 310 may provide no more than wireless signal modulation and demodulation functionality, or may provide more extensive signal processing, such as conversion of wireless signals to baseband information signals, as known in the art. Communications between the processor 302 and the transmitter 308 are shown as two separate paths. A transmitter control path 324 is used to convey non-data related information between the processor 302 and transmitter 308. Such non-data related information includes control parameters from the processor 302 necessary for the transmitter to operate correctly, e.g., outbound codes used to provide outbound traffic channels, etc. The transmitter data path 328 is used to convey information to be wirelessly transmitted, e.g., control signaling (such as group code update messages), digital voice/data information, etc. Likewise, communications between the processor 302 and the receiver 310 are also shown as two paths. The receiver control path 326 is used to convey information required for proper operation of the BTS, e.g., a detection signal as described below. The receiver data path 330 is used to convey wirelessly received information, e.g., control signaling (such as requests for group code updates), digital voice/data information, etc., to the processor 302.

The memory 304 of the BTS comprises at least one dedicated inbound code 332 and at least one dedicated outbound code 334. Additionally, the memory comprises information 336 associating dedicated inbound codes to their corresponding dedicated outbound codes. The information 336 associating the dedicated codes may comprise, for example, stored addresses for corresponding codes, or may arise out of the data structure used to store the dedicated codes. Regardless, in the preferred embodiment, the at least one dedicated inbound code 332 and the at least one dedicated outbound code 334 are unique to the site associated with the BTS 300 in the sense that any subscriber unit operating within that site must use codes identical to at least one of the dedicated inbound codes 332 and/or at least one of the dedicated outbound codes 334. Of course, it is possible that the same code could be used as a dedicated inbound or outbound code at different sites, subject to a site reuse pattern as known in the art. Also in the preferred embodiment, the dedicated codes 332–334 are arranged to provide a separate pair comprising one of the dedicated inbound codes 332 and one of the dedicated outbound codes 334 for each talk group in the system. For example, if the system supports twenty different talk groups, each BTS would require at least twenty different pairs of dedicated inbound and outbound codes if the BTS is going to be able to support group calls for all twenty groups. Of course, some number of dedicated code pairs less than the maximum number of groups available in the system could be provided, thereby selectively enabling group call functionality for a given subset of groups at a given site. As described above, the actual form of the dedicated codes 332–334 depends on the type of CDMA system used. Relative to the BTS 300, one of the at least one dedicated outbound codes 334 is used in the transmitter 308 to transmit an outbound group call signal; conversely, the one of the at least one dedicated inbound codes 332 is used to receive an inbound group call signal.

Figure 4:
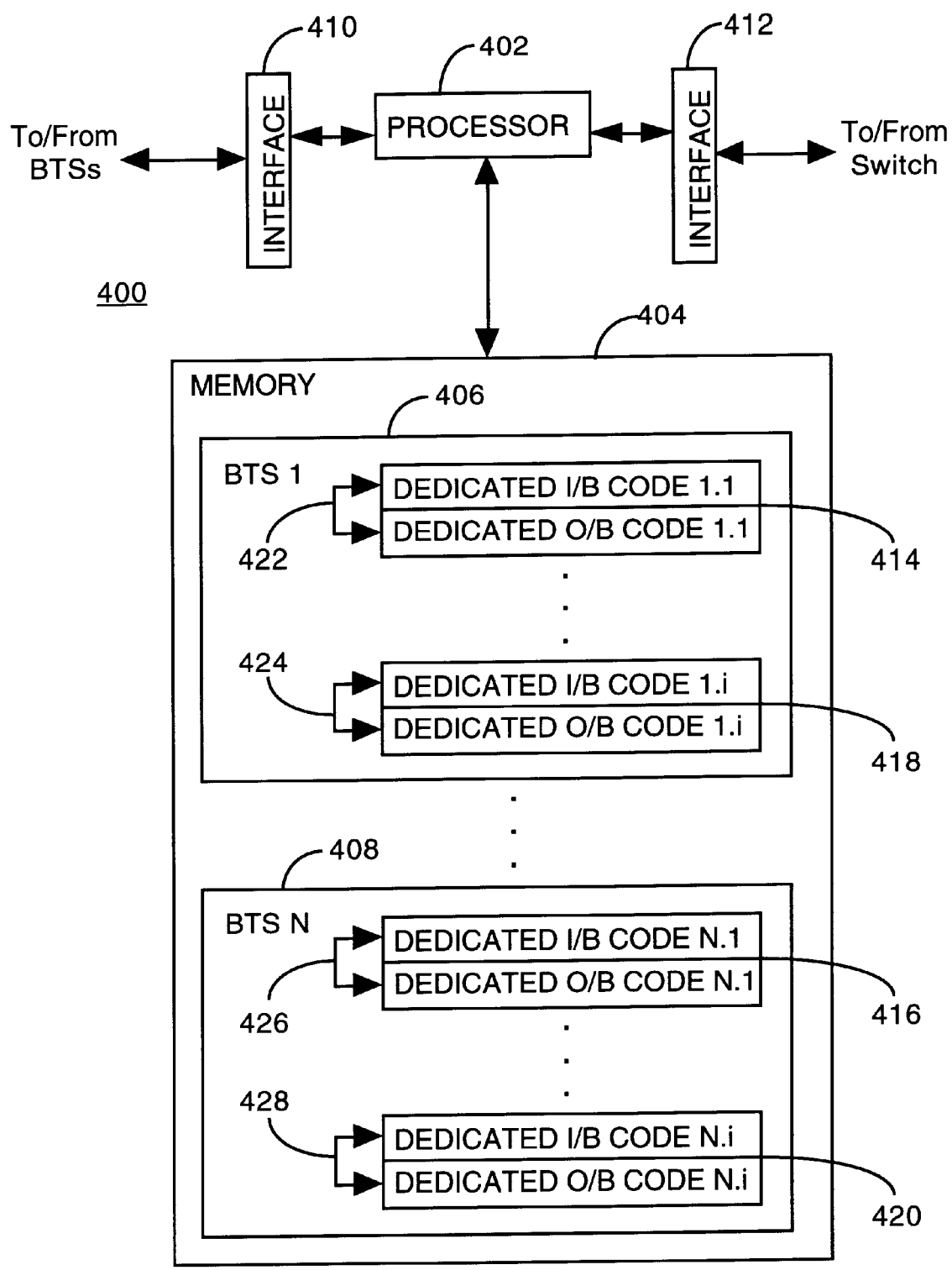
FIG. 4 is a block diagram of a controller in accordance with the present invention.

A typical, high-level structure of a controller 400 is shown in FIG. 4. A processor 402, which typically comprises one or more processing devices (e.g., microprocessors, digital signal processors, etc.), is coupled to a memory 404, such as RAM, ROM or similar device, or combination of such devices capable of storing digitally represented information. Additionally, the processor 402 is coupled to interfaces 410–412 which support communications between the controller 400 and the BTSs 122–124 and the switch 118, respectively. Each of these elements is well known in the art. In the preferred embodiment, under control of software algorithms stored in the memory 404 and in cooperation with the other elements shown, the processor 402 performs those tasks required for operation of the controller 400, including the method described relative to FIG. 8 below.

The memory 404 comprises information regarding at least one dedicated inbound code and at least one dedicated outbound code which information may be either the actual codes themselves or identifications of the codes. A preferred embodiment is illustrated in FIG. 4 wherein the memory 404 comprises a series of records 406–408, each corresponding to a separate base transceiver system. Within each record 406–408, at least one dedicated inbound code (or identification thereof) 414–416 and at least one dedicated outbound code (or identification thereof) 418–420 is stored, with pairs of dedicated inbound and outbound codes reserved for separate groups. Thus, in the example shown, there are N different BTSs having records, where each record for "BTS 1" through "BTS N" lists $i \geq 1$ different dedicated inbound/outbound code pairs.

Preferably, each code pair within a record is assigned to a corresponding group. Thus, for example, in site 1, talk group is assigned a dedicated inbound code 1.j and dedicated outbound code 1.j, where $1 \leq j \leq i$. In site N, however, talk group j is assigned a dedicated inbound code N.j and dedicated outbound code N.j, where $1 \leq j \leq i$. As with the subscriber units and BTSs, the memory 404 also includes information 422–428 associating dedicated inbound codes to their corresponding dedicated outbound codes, thereby establishing the pairs of dedicated codes.

In order for a communication system in accordance with the present invention to operate properly, the dedicated inbound and outbound codes (or identification thereof) stored in each record of the controller's memory must be "synchronized" with the dedicated inbound and outbound codes stored in the memory of the corresponding BTS. For example, assuming that the BTS 300 of FIG. 3 corresponds to the Nth record 408 stored in the controller's memory 404, the at least one dedicated inbound code 332 in the BTS 300 must identically match the dedicated inbound codes 416 (labeled N.1 through N.i) stored in the controller 400. Likewise, the at least one dedicated outbound code 334 must identically match the dedicated inbound codes 420 (labeled N.1 through N.i). Of course, if only identifications of the dedicated inbound and outbound codes are stored in the controller 400, as opposed to the codes themselves, the identifications stored in the controller must properly correlate with the dedicated inbound and outbound codes stored in the BTS.

With these structures for the subscriber units, BTSs and controller in mind, the operation of each of these entities may be further described with reference to FIGS. 5–8. FIG. 5 illustrates a flowchart of a method for use by a subscriber unit, particularly when initiating a group call. At step 501, the subscriber unit can optionally request a group code update. A group code update is data received by the subscriber unit that instructs the subscriber unit which codes to use in a given site as the at least one dedicated inbound code and the at least one dedicated outbound code. The request for the group code update may occur either at the instigation of a user of the subscriber unit, e.g., through the use of an input device, or may be automatically generated by the subscriber unit upon the occurrence of a predetermined event, e.g., registration with a new site. Regardless, the group code update request is transmitted to the BTS corresponding to the given site.

At step 502, the subscriber unit optionally receives a group code update message from the BTS corresponding to the subscriber unit's current site. Although the group code update message can be in response to a group code update request transmitted by the subscriber unit, it is understood that the group code update message can be received without the subscriber unit ever having requested it, i.e., if step 501 is not performed. For example, a BTS may transmit a group code update message periodically to all subscriber units currently operating within the corresponding site. Alternatively, the BTS may automatically transmit the group code update only when the dedicated codes in the BTS are updated/modified. Regardless, the group code update message contains data necessary for the subscriber unit to ascertain the dedicated inbound and outbound code(s), and their respective associations with each other, for the given site. Thus, the data may take the form of code identifications corresponding to codes already stored in the subscriber unit. Alternatively, the data may comprise the actual codes themselves. After receiving the group code update message, the subscriber unit will have knowledge of the dedicated inbound and outbound code(s) and their respective associations.

At step 503, the subscriber unit receives a request for a group call. That is, a user, through the use of an input device of the subscriber unit, signals to the subscriber unit that a group call is desired. In accordance with known techniques, the request for the group call specifies at least the particular talk group to be targeted in the group call and, in practice, the identification of the subscriber unit requesting the group call. In response to the request, at step 504, the subscriber unit retrieves a dedicated inbound code. In the preferred embodiment, the particular dedicated inbound code retrieved will uniquely correspond to the talk group for which the group call is being requested. Based on this dedicated inbound code, the subscriber unit will transmit an inbound group call signal at step 505. For the purposes of the present invention, the group call signal may comprise information of virtually any type, e.g., digital or analog voice information, text data, multimedia data, etc. Because the dedicated inbound code used in this procedure is reserved solely for use in group calls, relatively instantaneous access, akin to group call functionality in current private systems, is provided.

Figure 6:
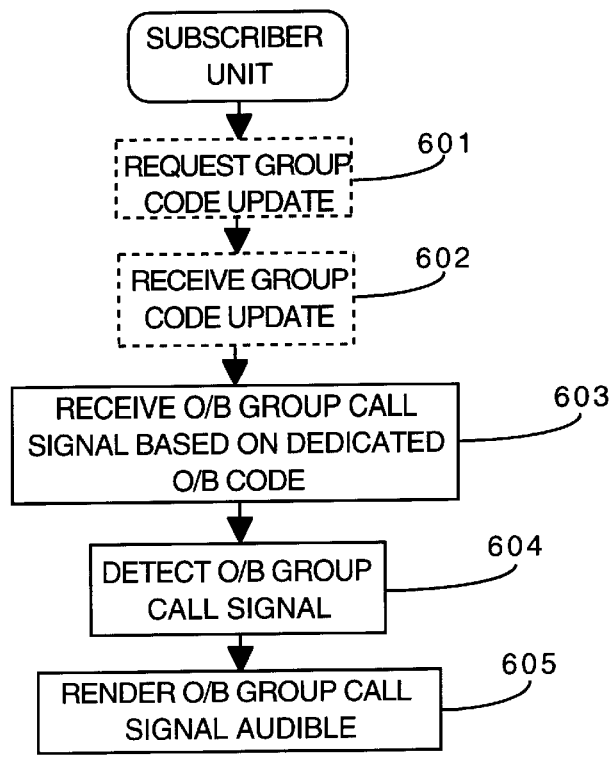

Referring now to FIG. 6, another method for use in a subscriber unit (particularly, a subscriber unit monitoring a group call) is illustrated. Steps 601 and 602 are functionally equivalent to steps 501 and 502, respectively, described above and are therefore not discussed in detail here. The result of steps 601 and/or 602 is that the subscriber unit has knowledge of the dedicated inbound and outbound codes and their respective associations. At step 603, the subscriber unit receives an outbound group call signal based on a dedicated outbound code corresponding to a given group. At step 604, the outbound group call signal is detected by the subscriber unit. As known in the art, a receiving subscriber unit can constantly monitor for multiple signals transmitted using a series of different codes. In the preferred embodiment, the detection step results in a detection signal when the outbound group call signal is detected. For example, referring to FIG. 2, the receiver 210 would issue a detection signal via the receiver control path 226 to the processor 202. In the receiver 210, the detection signal would be asserted when the output of a matched filter or correlation function corresponding to the dedicated outbound code is above a given threshold, as known in the art.

Once the detection signal has been asserted, indicating that an outbound group call signal is being received, the subscriber unit renders the outbound group call signal audible at step 605. Referring again to FIG. 2, the step of rendering the outbound group call signal audible would be carried out using the signal processing 218 to convert the outbound group call signal into the proper format for playback at the speaker 212. For example, if the outbound group call signal comprises compressed digital audio, the signal processing 218 decompresses the compressed digital audio, which decompressed audio would then be converted to analog form and sent to the speaker 212. In this manner, a subscriber unit in a public system may monitor a group call in much the same manner as in current private systems.

Referring now to FIG. 7, a method for use in a base transceiver system is shown. At step 701, a BTS may optionally receive a request for a group code update from a subscriber unit operating within the site defined by the BTS. The request, if received, includes the identification of the requesting subscriber unit. In response to the request, the BTS, at step 702, transmits a group code update message (as described above relative to FIG. 5) to the requesting subscriber unit. It is understood that a request for a group code update need not be received as a condition upon step 702 being performed. In particular, conditions could arise in which a group code update message is sent by the BTS to one or more subscriber units automatically, e.g., whenever any of the dedicated inbound and/or outbound codes stored in the BTS are modified/updated or when commanded to do so by a controlling entity, such as a console or manager terminal.

At step 703, the BTS receives an inbound group call signal based on a dedicated inbound code that is uniquely associated with a given talk group within that site. The inbound group call signal includes an identification of a talk group targeted by the inbound group call signal and, typically, an identification of the subscriber unit that initiated transmission of the inbound group call signal. In a manner similar to that described above relative to step 604, the BTS detects the inbound group call signal at step 704. That is, referring to the BTS 300 illustrated in FIG. 3, the receiver 310 issues a detection signal to the processor 302 indicating the inbound group call signal has been detected. Having detected the inbound group call signal, the BTS needs to ensure that the inbound group call signal is repeated as an outbound signal to all of the relevant talk group members. To this end, the present invention contemplates two options for the BTS.

In the first option, labeled Option A in FIG. 7, the BTS, upon detecting the inbound group call signal, automatically begins, at step 709, transmitting the inbound group call signal as an outbound group call signal based on a dedicated outbound code also uniquely associated with the given talk group within that site. In other words, the BTS immediately begins repeater operation. Of course, it is assumed in this case that there are subscriber units currently affiliated with the targeted talk group, other than the requesting subscriber unit, currently operating within the site served by the BTS.

The second and preferred option, labeled Option B in FIG. 7, may be performed as an alternative, or in addition, to Option A. In Option B, the BTS, upon detecting the inbound group call signal, conveys the inbound group call signal to its associated controller at step 705. Additionally, at step 706, the BTS conveys a first message indicating that the inbound group call was received by the BTS based on the dedicated inbound code for the given talk group within that site. The format for such messaging is well known in the art. If Option B is being performed in addition to Option A, then steps 707 and 708 are not performed because the inbound group call signal will already be repeated at step 709. However, if Option B is performed in lieu of Option A, the BTS receives an outbound group call signal from the controller at step 707. Again assuming that subscriber units currently affiliated with the targeted talk group, other than the requesting subscriber unit, are currently operating within the site served by the BTS, the outbound group call signal received at step 707 is a repeated version of the inbound group call signal. Also, at step 708, the BTS receives a second message from the controller indicating that the outbound group call signal received at step 707 is to be transmitted by the BTS based on a dedicated outbound code uniquely associated with the targeted talk group at that site. The outbound group call signal is then transmitted accordingly at step 709.

Figure 8:
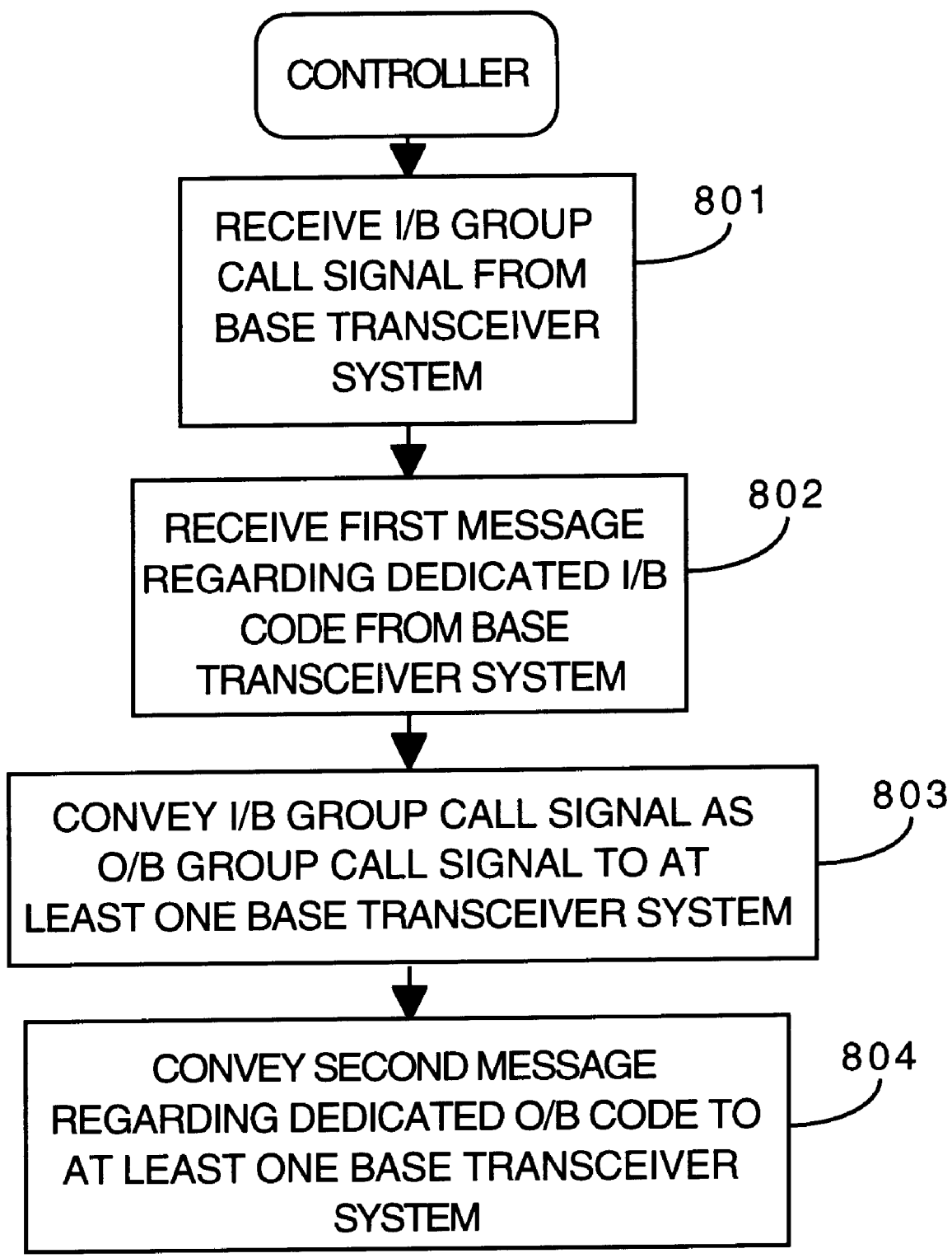
FIG. 8 is a flow chart illustrating a method for use by a controller in accordance with the present invention.

A method for a controller in accordance with the present invention is illustrated in FIG. 8. At step 801, the controller receives an inbound group call signal from a BTS. At step 802, the controller also receives a first message indicating that the inbound group call signal indicating that the inbound group call signal was received by the BTS based on a dedicated inbound code unique to a talk group targeted by the inbound group call signal and unique to the site served by the BTS. In turn, at step 803, the controller conveys the inbound group call signal to at least one BTS as an outbound group call signal. As known in current dispatch communication systems, the controller can determine which BTSs to send the outbound group call signal to based on stored information indicating the current site affiliations of various subscriber units in the talk group. As a result, if the BTS which sourced the inbound group call signal currently has only one subscriber unit from the targeted talk group currently operating within its site (presumably, therefore, the initiating subscriber unit), then that BTS can be excluded from those BTS to which the outbound group call signal is sent at step 803. Also, at step 804, the controller conveys a second message to the at least one BTS, the second message indicating a dedicated outbound code to be used by the at least one BTS in transmitting the outbound group call signal. Based on information stored in the controller, the controller selects a dedicated outbound code uniquely associated with the talk group in each of the sites serviced by the at least one BTS. Thus, if the second message is sent to more than one BTS, as would often be the case, the second message would either have to include all of the correct dedicated outbound code information for each BTS receiving the second message, or each BTS would need to receive the second message separately with only its own dedicated outbound code information therein.

For example, referring to the controller 400 illustrated in FIG. 4, assume that an inbound group call signal is received from BTS 1 along with a first message specifying dedicated inbound code 1.j. Further assume that at least two subscriber units affiliated with the targeted talk group are currently operating within the site served by BTS 1, and that other such subscriber units are currently operating within the site served by BTS N. By referring to the records 406–408 and the information 422–428 associating dedicated inbound and outbound codes stored in its memory 404, the controller can ascertain that a second message indicating dedicated outbound code 1.j should be sent to BTS 1, and that the same or a separate second message indicating dedicated outbound code N.j should be sent to BTS N.

The present invention generally provides for the support of group calls in a wireless CDMA communication system. This is achieved through the use of at least one dedicated inbound code and at least one dedicated outbound code provided solely for use in providing group calls. Using these dedicated codes, subscriber units, BTSs and controllers in the communication system can provide dispatch functionality not otherwise available in current public, CDMA communication systems.

The foregoing description of a preferred embodiment of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

We claim:

1. A subscriber unit for use in a wireless code division multiple access communication system comprising at least one base transceiver system coupled to a controller, wherein the subscriber unit is in wireless communication with the at least one base transceiver system, the subscriber unit further comprising:

an input device that provides a group call request;

a memory, operably coupled to the input device, comprising at least one dedicated inbound code, wherein the memory further comprises at least one dedicated outbound code; and a transmitter, operably coupled to the memory and responsive to the group call request, that transmits an inbound group call signal based on one of the at least one dedicated inbound code when the group call request is provided by input device.

2. The subscriber unit of claim 1, further comprising:

a receiver, operably coupled to the memory, that receives an outbound group call signal based on one of the at least one dedicated outbound code and that provides a detection signal when the outbound group call signal is detected; and means for rendering the outbound group call signal audible in response to the detection signal.

3. The subscriber unit of claim 2, wherein the one of the at least one dedicated inbound code and the one of the at least one dedicated outbound code correspond to a talk group with which the subscriber unit is currently affiliated.

4. The subscriber unit of claim 1, wherein the input device further comprises:

means for requesting a group code update message comprising information regarding the at least one dedicated inbound code and at least one dedicated outbound code.

5. The subscriber unit of claim 1, further comprising:

a receiver, operably coupled to the memory, that receives a group code update message comprising information regarding the at least one dedicated inbound code and at least one dedicated outbound code.

6. A base transceiver system for use in a wireless code division multiple access communication system comprising at least one subscriber unit and a controller, wherein the base transceiver system is coupled to the controller and in wireless communication with the at least one subscriber unit, the base transceiver system comprising:

a memory comprising at least one dedicated inbound code and at least one dedicated outbound code;

a receiver, operably coupled to the memory, that receives an inbound group call signal based on one of the at least one dedicated inbound code and that provides a detection signal when the inbound group call signal is detected; and a transmitter, coupled to the memory and the detector, that re-transmits the inbound group call signal as an outbound group call signal based on one of the at least one dedicated outbound code responsive to the detection signal.

7. The base transceiver system of claim 6, wherein the memory further comprises information associating the one of the at least one dedicated inbound code with the one of the at least one dedicated outbound code.

8. The base transceiver system of claim 6, further comprising:

means, coupled to receiver, for conveying the inbound group call signal, responsive to the detection signal, to the controller; and means, coupled to the receiver, for conveying, to the controller and responsive to the detection signal, a first message that the inbound group call signal was received based on the one of the at least one dedicated inbound code.

9. The base transceiver system of claim 6, wherein the one of the at least one dedicated inbound code and the one of the at least one dedicated outbound code correspond to a talk group targeted by the inbound group call signal.

10. The base transceiver system of claim 6, wherein the receiver further comprises means for receiving a request for a group code update message from a subscriber unit of the at least one subscriber unit, and wherein the transmitter further comprises means for transmitting the group code update message comprising information regarding the at least one dedicated inbound code and the at least one dedicated outbound code to the subscriber unit.

11. A base transceiver system for use in a wireless code division multiple access communication system comprising at least one subscriber unit and a controller, wherein the base transceiver system is coupled to the controller and in wireless communication with the at least one subscriber unit, the base transceiver system comprising:

a memory comprising at least one dedicated inbound code and at least one dedicated outbound code;

a receiver, operably coupled to the memory, that receives an inbound group call signal based on one of the at least one dedicated inbound code and that provides a detection signal when the inbound group call signal is detected;

means, coupled to receiver, for conveying the inbound group call signal, responsive to the detection signal, to the controller coupled to the base transceiver system; and means, coupled to the receiver, for conveying, to the controller and responsive to the detection signal, a first message that the inbound group call signal was received based on the one of the at least one dedicated inbound code.

12. The base transceiver system of claim 11, further comprising:

means for receiving, from the controller, an outbound group call signal;

means for receiving, from the controller, a second message that the outbound group call signal is to be transmitted based on one of the at least one dedicated outbound code; and a transmitter, coupled to the memory, the means for receiving the outbound group call signal and the means for receiving the second message, that transmits the outbound group call signal based on the one of the at least one dedicated outbound code.

13. The base transceiver system of claim 12, wherein the receiver further comprises means for receiving a request for a group code update message from a subscriber unit of the at least one subscriber unit, and wherein the transmitter further comprises means for transmitting the group code update message comprising information regarding the at least one dedicated inbound code and the at least one dedicated outbound code to the subscriber unit.

14. The base transceiver system of claim 11, wherein the one of the at least one dedicated inbound code and the one of the at least one dedicated outbound code correspond to a talk group targeted by the inbound group call signal.

15. A controller for use in a wireless code division multiple access communication system comprising a plurality of base transceiver systems in wireless communication with a plurality of subscriber units, wherein the controller is coupled to the plurality of base transceiver systems, the controller comprising:

means for receiving, from a first base transceiver system of the plurality of base transceiver systems, an inbound group call signal;

means for receiving, from the first base transceiver system, a first message that the inbound group call signal was received based on one of at least one dedicated inbound code;

means, coupled to the means for receiving the inbound group call signal, for conveying to at least one base transceiver system of the plurality of base transceiver systems the inbound group call signal as an outbound group call signal; and means, coupled to the means for receiving the first message, for conveying to the at least one base transceiver system a second message that the outbound group call signal is to be transmitted based on one of at least one dedicated outbound code.

16. The controller of claim 15, further comprising a memory, coupled to the means for receiving the first message and the means for conveying the second message, comprising information associating the one of the at least one dedicated inbound code to the one of the at least one dedicated outbound code.

17. The controller of claim 16, wherein the memory comprises the at least one dedicated inbound code and the at least one dedicated outbound code.

18. The controller of claim 15, wherein the at least one base transceiver system includes the first base transceiver system.

19. The controller of claim 15, wherein the at least one base transceiver system excludes the first base transceiver system.

20. In a wireless code division multiple access communication system comprising at least one base transceiver system coupled to a controller and in wireless communication with at least one subscriber unit, a method for a subscriber unit of the at least one subscriber unit to participate in a communication, the method comprising steps of:

storing at least one dedicated outbound code;

receiving, via an input device, a request for a group call;

retrieving, responsive to the request, a dedicated inbound code; and transmitting, responsive to the request, an inbound group call signal based on the dedicated inbound code.

21. The method of claim 20, further comprising steps of:

receiving an outbound group call signal based on the dedicated outbound code;

detecting that the outbound group call signal has been received; and rendering the outbound group call signal audible in response to the step of detecting the outbound group call signal.

22. The method of claim 20, wherein the dedicated inbound code and the dedicated outbound code correspond to a talk group with which the subscriber unit is currently affiliated.

23. The method of claim 20, further comprising a step of:

receiving a group code update message comprising information regarding the dedicated inbound code and the dedicated outbound code.

24. The method of claim 23, further comprising a step of, prior to the step of receiving the group code update message:

requesting the group code update message.

25. In a wireless code division multiple access communication system comprising at least one base transceiver system coupled to a controller and in wireless communication with at least one subscriber unit, a method for the at least one base transceiver system to facilitate a communication, the method comprising steps of:

receiving an inbound group call signal based on a dedicated inbound code;

detecting that the inbound group call signal has been received; and transmitting the inbound group call signal as an outbound group call signal based on a dedicated outbound code responsive to the step of detecting.

26. The method of claim 25, further comprising:

conveying the inbound group call signal, responsive to the step of detecting, to the controller; and conveying, to the controller and responsive to the step of detecting, a first message that the inbound group call signal was received based on the dedicated inbound code.

27. The method of claim 25, wherein the dedicated inbound code and the dedicated outbound code correspond to a talk group targeted by the inbound group call signal.

28. The method of claim 25, further comprising steps of:

receiving a request for a group code update message from a subscriber unit of the at least one subscriber unit; and transmitting the group code update message comprising information regarding the dedicated inbound code and the dedicated outbound code to the subscriber unit.

29. In a wireless code division multiple access communication system comprising at least one base transceiver system coupled to a controller and in wireless communication with at least one subscriber unit, a method for the at least one base transceiver system to facilitate a communication, the method comprising steps of:

receiving an inbound group call signal based on a dedicated inbound code;

detecting that the inbound group call signal has been received;

conveying the inbound group call signal, responsive to the step of detecting, to the controller; and conveying, to the controller and responsive to the step of detecting, a first message that the inbound group call signal was received based on the dedicated inbound code.

30. The method of claim 29, further comprising:

receiving, from the controller, an outbound group call signal;

receiving, from the controller, a second message that the outbound group call signal is to be transmitted based on a dedicated outbound code; and transmitting, responsive to the steps of receiving the outbound group call signal and receiving the second message, the outbound group call signal based on the dedicated outbound code.

31. The method of claim 30, wherein the dedicated inbound code and the dedicated outbound code correspond to a talk group targeted by the inbound group call signal.

32. The method of claim 29, further comprising steps of:

receiving a request for a group code update message from a subscriber unit of the at least one subscriber unit; and transmitting the group code update message comprising information regarding the dedicated inbound code and the dedicated outbound code to the subscriber unit.

33. In a wireless code division multiple access communication system comprising a controller coupled to a plurality of base transceiver system, the plurality of base transceiver systems in wireless communication with at least one subscriber unit, a method for the controller to facilitate a communication, the method comprising steps of:

receiving, from a first base transceiver system of the plurality of base transceiver systems, an inbound group call signal;

receiving, from the first base transceiver system, a first message that the inbound group call signal was received based on a dedicated inbound code;

conveying, to at least one base transceiver system of the plurality of base transceiver systems, the inbound group call signal as an outbound group call signal; and conveying, to the at least one base transceiver system, a second message that the outbound group call signal is to be transmitted based on a dedicated outbound code.

34. The method of claim 33, wherein the step of conveying the second message further comprises a step of:

determining that the dedicated inbound code is associated with the dedicated outbound code.

35. The method of claim 33, wherein the steps of conveying the outbound group call signal and the second message to the at least one base transceiver system includes the first base transceiver system.

36. The method of claim 33, wherein the steps of conveying the outbound group call signal and the second message to the at least one base transceiver system excludes the first base transceiver system.

* * * * *